United States Patent
Liu

(10) Patent No.: US 9,843,029 B1
(45) Date of Patent: *Dec. 12, 2017

(54) LITHIUM BATTERY STRUCTURES

(71) Applicant: HRL Laboratories, LLC, Malibu, CA (US)

(72) Inventor: Ping Liu, Irvine, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,152

(22) Filed: Nov. 30, 2014

Related U.S. Application Data

(62) Division of application No. 14/023,542, filed on Sep. 11, 2013, now Pat. No. 8,962,173, which is a division of application No. 13/851,099, filed on Mar. 26, 2013, now Pat. No. 8,623,556, which is a division of application No. 12/759,720, filed on Apr. 14, 2010, now Pat. No. 8,481,195.

(51) Int. Cl.
| | |
|---|---|
| *H01M 2/16* | (2006.01) |
| *H01M 10/052* | (2010.01) |
| *H01M 10/0562* | (2010.01) |
| *H01M 12/08* | (2006.01) |

(52) U.S. Cl.
CPC ......... *H01M 2/164* (2013.01); *H01M 2/1646* (2013.01); *H01M 2/1686* (2013.01); *H01M 10/052* (2013.01); *H01M 10/0562* (2013.01); *H01M 12/08* (2013.01)

(58) Field of Classification Search
CPC .. H01M 2/164; H01M 2/1646; H01M 2/1686; H01M 10/052; H01M 10/0562
See application file for complete search history.

(56) References Cited

U.S. PATENT DOCUMENTS

| | | | |
|---|---|---|---|
| 8,481,195 B1 * | 7/2013 | Liu | H01M 10/0562 429/129 |
| 8,623,556 B1 * | 1/2014 | Liu | H01M 10/0562 429/129 |
| 2005/0175894 A1 | 8/2005 | Visco et al. | |
| 2009/0061288 A1 | 3/2009 | Gordon et al. | |

FOREIGN PATENT DOCUMENTS

| | | | |
|---|---|---|---|
| EP | 1826861 A1 * | 8/2007 | |
| JP | 06076824 A | 3/1994 | |

OTHER PUBLICATIONS

Hideaki Ohtsuka and Akihiko Yamaji, "Preparation and Electrical Conductivity of Lisicon Thin Films," Solid State Ionics 8 (1983) 43-48, North-Holland Publishing Company.

* cited by examiner

*Primary Examiner* — Gregg Cantelmo
(74) *Attorney, Agent, or Firm* — O'Connor & Company

(57) ABSTRACT

This invention provides a novel battery structure that, in some variations, utilizes a mixed lithium-ion and electron conductor as part of the separator. This layer is non-porous, conducting only lithium ions during operation, and may be structurally free-standing. Alternatively, the layer can be used as a battery electrode in a lithium-ion battery, wherein on the side not exposed to battery electrolyte, a chemical compound is used to regenerate the discharged electrode. This battery structure overcomes critical shortcomings of current lithium-sulfur, lithium-air, and lithium-ion batteries.

8 Claims, 5 Drawing Sheets

LITHIUM BATTERY STRUCTURES

PRIORITY DATA

This patent application is a divisional application of U.S. Pat. No. 8,962,173, issued on Feb. 24, 2015, which is a divisional of U.S. Pat. No. 8,623,556, issued on Jan. 7, 2014, which is a divisional of U.S. Pat. No. 8,481,195, issued on Jul. 9, 2013, each of which is hereby incorporated by reference herein.

FIELD OF THE INVENTION

The present invention generally relates to improved battery structures, such as lithium-ion, lithium-sulfur, and lithium-air batteries.

BACKGROUND OF THE INVENTION

Batteries based on lithium (Li), such as lithium-ion batteries, are attractive due to their high energy density compared to other commercial batteries. Lithium-ion batteries are used commercially today in computers, cell phones, and related devices.

Lithium-based batteries (including lithium-ion, lithium-sulfur, and lithium-air systems) have significant potential in transportation applications, such as electric vehicles. For transportation-related applications, long cycle life is a requirement. Presently, this requirement has not been met.

Battery lifetime is often a critical factor in the marketplace, especially for commercial, military, and aerospace applications. Previous methods of extending battery life include employing long-life cathode and anode materials, and restricting battery operation to avoid conditions detrimental to battery life. Examples of such detrimental conditions include high and low temperatures, high depths of discharge, and high rates. These restrictions invariably lead to under-utilization of the battery, thus lowering its effective energy density. In addition, precise control of cell temperature with aggressive thermal management on the pack level is usually required, which adds significantly to system weight, volume, and cost.

A problem in the art associated with lithium-sulfur, lithium-air, and lithium-ion batteries is undesirable chemical migration that results in parasitic chemical reactions at the anode or cathode. For example, in batteries with manganese oxide and iron phosphate cathodes, dissolved metal ions often migrate to the anode where they are reduced and compromise the integrity of the solid electrolyte interface layer. Battery capacity degrades due to consumption of active ions. Battery storage and cycle life can be greatly improved if such undesirable chemical interactions are reduced or eliminated.

A successful battery separator layer should have a wide electrochemical stability window to be stable against the battery anode and cathode. In addition, the separator layer needs to have limited electronic conductivity in order to prevent electrical leakage between the two electrodes. When both requirements are imposed, the available materials are very limited and solid electrolyte is rarely free-standing.

In view of the foregoing shortcomings, new battery structures are needed to address important commercialization issues associated with lithium-sulfur, lithium-air, and lithium-ion batteries. For example, a relatively thin free-standing separator layer is a long-felt need in the art. Preferred battery structures would help prevent or eliminate battery failure due to eventual contamination during operation, thereby increasing battery lifetime and overall energy efficiency.

SUMMARY OF THE INVENTION

The present invention addresses the aforementioned needs in the art, as will now be summarized and further described in detail herein.

In some variations, this invention provides a battery structure comprising:

(a) an anode for extracting selected metal ions (such as lithium ions);

(b) a cathode for inserting the metal ions;

(c) an electrolyte for transporting the metal ions between the anode and the cathode; and (d) a separator comprising a non-porous layer that is electronically conductive and permeable to the metal ions but not appreciably permeable to any other chemical species.

The non-porous layer is a mixed ion and electron conductor with various ionic and electronic conductivities. In some embodiments, the ionic conductivity of the metal ions in the non-porous layer is selected from about $10^{-5}$ to $10^{-2}$ S/cm, such as about $10^{-3}$ to $10^{-2}$ S/cm. In some embodiments, the electronic conductivity of electrons in the non-porous layer is selected from about $10^{-2}$ to $10^2$ S/cm, such as about $10^{-1}$ to 1 S/cm.

The non-porous layer may have a thickness selected from about 2 to 200 µm, for example. In some embodiments, the non-porous layer is a free-standing layer without structural support by either of the anode or the cathode.

In some embodiments, the non-porous layer comprises lithium metal oxide, lithium metal phosphate, or lithium metal sulfide. The non-porous layer may have a composition that is the same as, or different from, the composition of either of the anode or the cathode.

In various embodiments, the non-porous layer comprises one or more compositions selected from the group consisting of $Li_xMn_2O_4$ (0<x<2), $Li_xCoO_2$ (0<x<1), $Li_xNiO_2$ (0<x<1), $Li_xV_2O_y$ (0<x<5, 4<y<5), $Li_xTiO_2$ (0<x<1), $Li_{4+x}Ti_5O_{12}$ (0<x<3), $Li_xWO_3$ (0<x<0.5), $Li_xNb_2O_5$ (0<x<3), $Li_xTiS_2$ (0<x<1), $Li_xMPO_4$ (M=Mn, Fe, and/or V; 0<x<1), and $LiMPO_4$ (M=Co, Fe, and/or V).

In some embodiments, the cathode comprises $Li_xMn_2O_4$ (0<x<2) and/or $Li_xMPO_4$ (M=Mn, Fe, and/or V). In some embodiments, the cathode comprises sulfur.

Other variations of the invention provide a battery structure comprising:

(a) an anode for extracting selected metal ions;

(b) an assisted cathode comprising (i) a non-porous layer for inserting the metal ions, and (ii) an oxidant capable of reacting with the metal ions derived from the non-porous layer, to form a reductant; and (c) an electrolyte for transporting the metal ions between the anode and the assisted cathode, wherein the non-porous layer is electronically conductive and permeable to the metal ions but not appreciably permeable to any other chemical species.

In certain embodiments of this variation, the ionic conductivity of the metal ions in the non-porous layer is selected from about $10^{-5}$ to $10^{-2}$ S/cm and the electronic conductivity of electrons in the non-porous layer is selected from about $10^{-2}$ to $10^2$ S/cm. For example, the ionic conductivity of the metal ions may be selected from about $10^{-3}$ to $10^{-2}$ S/cm and the electronic conductivity may be selected from about $10^{-1}$ to 1 S/cm.

The selected metal ions are lithium ions and the non-porous layer comprises lithium metal oxide, in some embodiments. In various embodiments, the non-porous layer comprises one or more compositions selected from the group consisting of $Li_xMn_2O_4$ (0<x<2), $Li_xCoO_2$ (0<x<1), $Li_xNiO_2$ (0<x<1), $Li_xV_2O_y$ (0<x<5, 4<y<5), $Li_xTiO_2$ (0<x<1), $Li_{4+x}Ti_5O_{12}$ (0<x<3), $Li_xWO_3$ (0<x<0.5), $Li_xNb_2O_5$ (0<x<3), $Li_xTiS_2$ (0<x<1), $Li_xMPO_4$ (M=Mn, Fe, and/or V; 0<x<1), and $LiMPO_4$ (M=Co, Fe, and/or V).

In some embodiments utilizing an assisted cathode, the oxidant comprises $Li_2S_y$, y=2-8. In other embodiments, the oxidant is selected from the group consisting of $O_2$, $Br_2$, $SO_2$, $SOCl_2$, $SO_2Cl_2$, and $I_2$. Optionally, when $O_2$ is used as an oxidant, the oxygen is derived from air.

This invention provides a lithium-ion battery comprising a plurality of battery structures, each including:

(a) an anode for extracting lithium ions;

(b) a cathode for inserting lithium ions;

(c) an electrolyte for transporting lithium ions between the anode and the cathode; and (d) a separator comprising a non-porous layer that is electronically conductive and permeable to lithium ions but not appreciably permeable to any other chemical species.

This invention further provides a lithium-sulfur battery comprising a plurality of battery structures, each including:

(a) an anode for extracting lithium ions;

(b) an assisted cathode comprising (i) a non-porous layer for inserting the lithium ions, and (ii) polysulfides of lithium as oxidants capable of reacting with the lithium ions derived from the non-porous layer; and (c) an electrolyte for transporting the lithium ions between the anode and the assisted cathode, wherein the non-porous layer is electronically conductive and permeable to the metal ions but not appreciably permeable to any other chemical species.

This invention additionally provides a lithium-air battery comprising a plurality of battery structures, each including:

(a) an anode for extracting lithium ions;

(b) an assisted cathode comprising (i) a non-porous layer for inserting the lithium ions, and (ii) $O_2$ derived from air as an oxidant capable of reacting with the lithium ions derived from the non-porous layer; and (c) an electrolyte for transporting the lithium ions between the anode and the assisted cathode, wherein the non-porous layer is electronically conductive and permeable to the metal ions but not appreciably permeable to any other chemical species.

In a particular embodiment, a lithium-based battery comprising a plurality of electrochemical cells is provided, wherein each of the cells includes:

(a) an anode for extracting lithium ions;

(b) a cathode for inserting the lithium ions;

(c) an electrolyte for transporting the lithium ions between the anode and the cathode; and (d) a free-standing separator comprising a laminated non-porous layer that is permeable to the lithium ions but not appreciably permeable to any other chemical species, wherein the non-porous layer comprises one or more compositions selected from the group consisting of $Li_xMn_2O_4$ (0<x<2), $Li_xCoO_2$ (0<x<1), $Li_xNiO_2$ (0<x<1), $Li_xV_2O_y$ (0<x<5, 4<y<5), $Li_xTiO_2$ (0<x<1), $Li_{4+x}Ti_5O_{12}$ (0<x<3), $Li_xWO_3$ (0<x<0.5), $Li_xNb_2O_5$ (0<x<3), $Li_xTiS_2$ (0<x<1), $Li_xMPO_4$ (M=Mn, Fe, and/or V; 0<x<1), and $LiMPO_4$ (M=Co, Fe, and/or V);

and wherein the ionic conductivity of the metal ions in the non-porous layer is from $10^{-3}$ to $10^{-2}$ S/cm and the electronic conductivity of electrons in the non-porous layer is from $10^{-1}$ to 1 S/cm.

DETAILED DESCRIPTION OF EMBODIMENTS OF THE INVENTION

Figure 1:
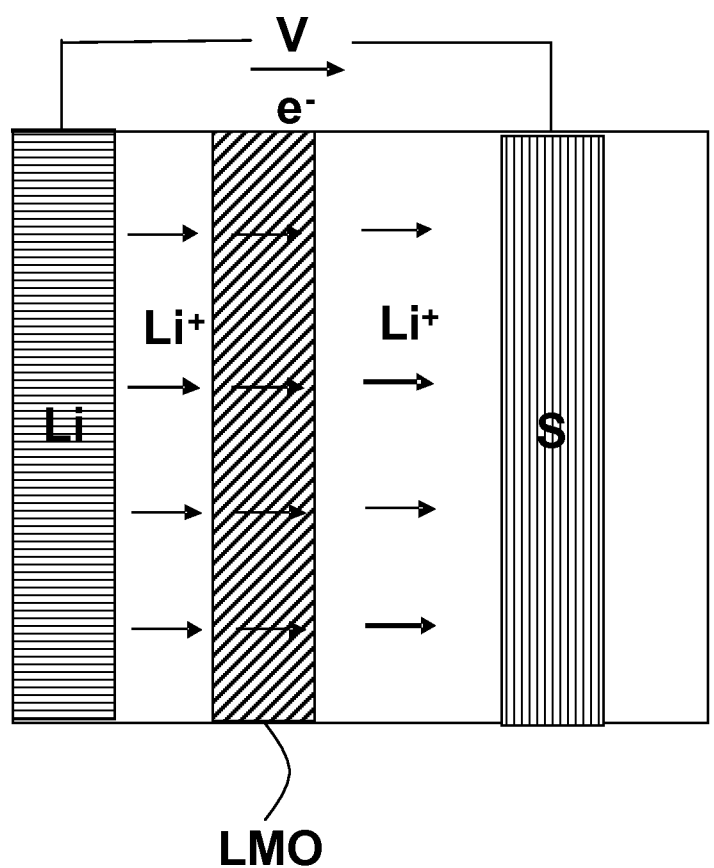
FIG. 1 depicts a lithium-sulfur battery with a lithium metal oxide layer as part of the separator, according to some embodiments of the invention.

The structures and methods of the present invention will be described in detail by reference to various non-limiting embodiments of the invention.

Unless otherwise indicated, all numbers expressing dimensions, capacities, conductivities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

As used in this specification and the appended claims, the singular forms "a," "an," and "the" include plural referents unless the context clearly indicates otherwise.

As used herein, "battery," "battery structure," "electrochemical cell," "galvanic cell," and the like are used interchangeably to mean one or more unit cells to convert chemical energy into electrical energy.

The primary functional components of a typical battery are the anode; cathode; electrolyte, in which ions move between the anode and cathode in the electrolyte; and a separator between cathode and anode to block passage of electrons (prevent short circuit). Current collectors, normally metal, are used to transport electrons at the cathode and anode. The active ions move from the anode to the cathode during discharge and from the cathode to the anode when charging.

Some variations of the invention are premised on the discovery that a substantially non-porous layer is a beneficial component of a battery separator for lithium-based batteries. For present purposes and in the context of lithium-based battery systems, "substantially non-porous" or "non-porous" are intended to mean that the layer is permeable to lithium ions ($Li^+$) but not appreciably permeable to any other chemical species. A "chemical species" means an atom, molecule, or particle comprising at least one proton. In various embodiments, the lithium-ion conductivity of the substantially non-porous layer is from $10^{-5}$ to $10^{-2}$ S/cm, preferably from $10^{-3}$ to $10^{-2}$ S/cm.

Generally speaking, with respect to metals ions selected for a particular battery (i.e., not necessarily lithium ions), a "non-porous" layer means that the layer is permeable to the selected metal ions but not appreciably permeable to any other chemical species.

Of course, the non-porous layer should not contain large pores, such as an average pore size of greater than 1 micron. That is, pores should not be available for chemical species to pass through the separator layer directly (i.e., by simple pore diffusion or convection). If there are minor structural defects in the separator layer introduced during battery manufacturing or operation, small amounts of other chemical species can be expected to pass through the layer by convection through the defects.

A non-porous layer is also electronically conductive in addition to providing good lithium-ion conductivity, in preferred embodiments of the invention. In various embodiments, the electronic conductivity of the non-porous layer is from $10^{-2}$ to $10^2$ S/cm, such as from $10^{-1}$ to 1 S/cm.

As will be appreciated by skilled artisans, the flexibility to select electronically conductive materials for the non-porous layer opens up classes of materials that would not be preferred if electronic conductivity needed to be minimized. For example, anode and cathode materials can be implemented as the non-porous layer. Known lithium ion conductors tend to have low conductivities ($\sim 10^{-6}$ S/cm). The ionic conductivity of battery electrode materials can reach at least $10^{-3}$ S/cm due to the orders-of-magnitude higher mobile lithium ion concentration in the solid phase.

One advantage to high ion conductivity is that the non-porous layer does not need to be extremely thin. Rather, the non-porous layer can be relatively thick, allowing it to be structurally free-standing. "Free-standing" here means that the non-porous layer, a composite (laminated) layer, does not rely on either the anode or cathode for structural support. In various embodiments, the thickness of the non-porous layer is in the range of 2-200 μm, such as 20-100 μm.

Non-porous layer compositions include, but are by no means limited to, $Li_xMn_2O_4$ (0<x<2), $Li_xCoO_2$ (0<x<1), $Li_xNiO_2$ (0<x<1), $Li_xV_2O_y$ (0<x<5, 4<y<5), $Li_xTiO_2$ (0<x<1), $Li_{4+x}Ti_5O_{12}$ (0<x<3), $Li_xWO_3$ (0<x<0.5), and $Li_xNb_2O_5$ (0<x<3). In addition, non-oxide materials such as $Li_xTiS_2$ (0<x<1), $Li_xMPO_4$ (M=Mn, Fe, and/or V; 0<x<1), and $LiMPO_4$ (M=Co, Fe, and/or V) can be utilized.

Variations of the present invention will now be described, including by reference to the accompanying figures. The figures provide representative illustration of the invention and are not limiting in their content. It will be understood by one of ordinary skill in the art that the scope of the invention extends beyond the specific embodiments depicted. The principles and scope of the present invention are not limited to lithium-based batteries.

Lithium-sulfur batteries have theoretical energy densities of 2500 Wh/kg (watt-hours per kilogram), in contrast to 560 Wh/kg for lithium-ion batteries. Commercialization of lithium-sulfur batteries has been hindered by technical difficulties. When sulfur electrode is discharged, it forms a series of polysulfides that are soluble in common battery electrolytes. The dissolved compounds can migrate to the lithium electrode, effectively creating an internal short mechanism with greatly reduced energy efficiency. Metal lithium forms dendrites during repeated cycling due to non-uniform dissolution and deposition. These dendrites are highly reactive with electrolytes and can even penetrate the separator to create internal shorting. The non-porous layer provided by the present invention, by allowing passage of lithium ions but no other chemical species, can effectively shut down these internal shorting mechanisms.

FIG. 1 depicts a lithium-sulfur battery structure employing the new separator concept. In a normal lithium-sulfur battery, a porous polymer separator is sandwiched between lithium and sulfur electrodes and soaked with liquid electrolyte. In FIG. 1, the separator consists of three layers—lithium metal oxide as the middle layer, sandwiched by a porous material (e.g., polymer) in the outer layers. The lithium metal oxide layer is non-porous, exclusively allowing lithium ions to pass.

The composition of the lithium metal oxide layer can be selected from any battery anode or cathode materials. In some embodiments, the composition includes one or more of materials selected from the group consisting of $Li_xMn_2O_4$ (0<x<2), $Li_xCoO_2$ (0<x<1), $Li_xNiO_2$ (0<x<1), $Li_xV_2O_y$ (0<x<5, 4<y<5), $Li_xTiO_2$ (0<x<1), $Li_{4+x}Ti_5O_{12}$ (0<x<3), $Li_xWO_3$ (0<x<0.5), $Li_xNb_2O_5$ (0<x<3), $Li_xTiS_2$ (0<x<1), $Li_xMPO_4$ (M=Mn, Fe, and/or V; 0<x<1), and $LiMPO_4$ (M=Co, Fe, and/or V).

The non-porous layer may be fabricated from a powder precursor, in some embodiments. The powder may be mixed with a polymer binder (such as polyvinylidene fluoride, PVDF) dissolved in a suitable solvent. The slurry may be cast into tapes. After drying, the tapes may be hot-pressed at a temperature above the melting point of the polymer so that porosity can be eliminated.

The non-porous layer may be further laminated with two porous layers to form a composite separator. These porous layers are preferably electronically resistive to help prevent an electrical short circuit. The porous layers may be fabricated from any material that is suitable as a normal separator layer known in the art. Examples include olefin polymers (e.g., polyethylene or polypropylene), fluorine-containing polymers, cellulose polymers (e.g., paper), polyimides, nylons, glass fibers, alumina fibers, and porous metal foils. The form of the porous layer may be a non-woven fabric, a woven fabric, a microporous film, a foil, or another configuration that may be selected for its mechanical strength or other properties, or for cost reasons.

Figure 2:
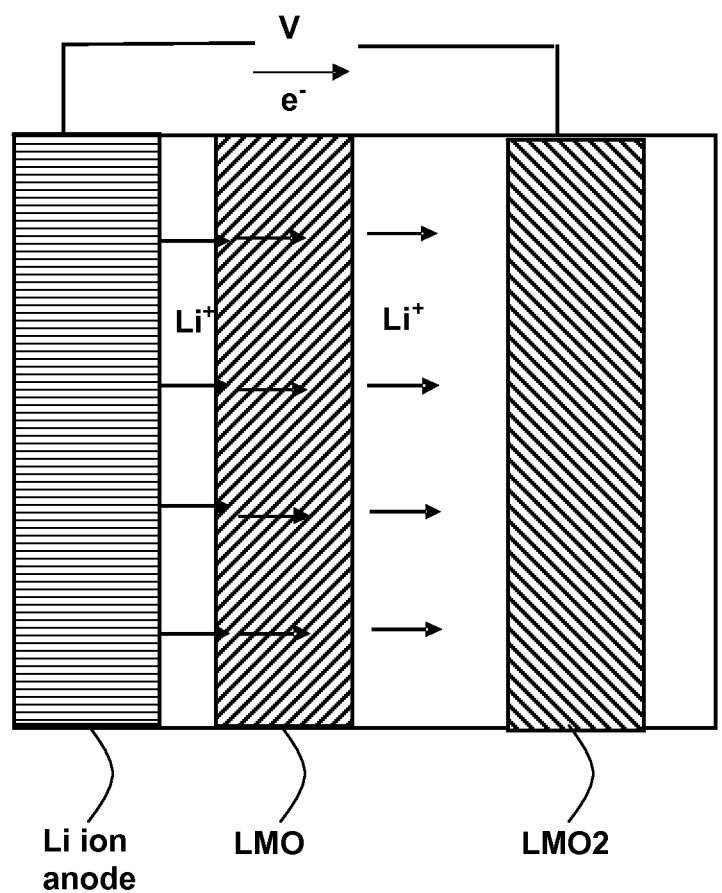
FIG. 2 depicts a lithium-ion battery employing non-porous lithium metal oxide as the battery separator, according to some embodiments.

The principles of the present invention can also be applied to various lithium-ion battery structures. FIG. 2 shows a lithium-ion battery structure wherein a non-porous lithium metal oxide layer is part of the battery separator. This battery includes an anode, a three-layer separator comprising a lithium metal oxide (LMO) non-porous layer sandwiched by porous layers, and a cathode denoted in FIG. 2 as LMO2. LMO2 may be fabricated from any known cathode materials. In some preferred embodiments, LMO2 includes $LiMPO_4$ (M=Co, Fe, or V) and/or $LiMn_2O_4$ (or other manganese-containing compounds).

During battery storage and cycling, in particular at elevated temperatures, metal from LMO2 can dissolve in the battery electrolytes and, without the presence of LMO, would migrate to the lithium-ion anode surface and lead to capacity loss. The LMO layer blocks such migration, thus extending the lithium-ion battery's life.

Other variations of the invention relate to lithium-air batteries. Lithium-air batteries generally use porous cathodes to catalyze the reduction of oxygen. These batteries have a theoretical energy density of 5220 Wh/kg and have significant potential because atmospheric air may be utilized at low cost and high availability. A major technical challenge associated with lithium-air batteries known in the art is the chemical corrosion of lithium due to moisture from the ambient atmosphere.

The non-porous layer described herein is effective for separating the lithium electrode from the ambient atmosphere, thereby reducing the influence of moisture and extending the battery's life. When a non-porous lithium metal oxide layer is present, it is possible to pair a non-aqueous reaction involving lithium with a reaction involving oxygen. The lithium metal oxide layer prevents water from contaminating the left-hand side of the battery. A non-aqueous environment for lithium is important because lithium reacts intensely with water, forming lithium hydroxide and flammable hydrogen.

Figure 3:
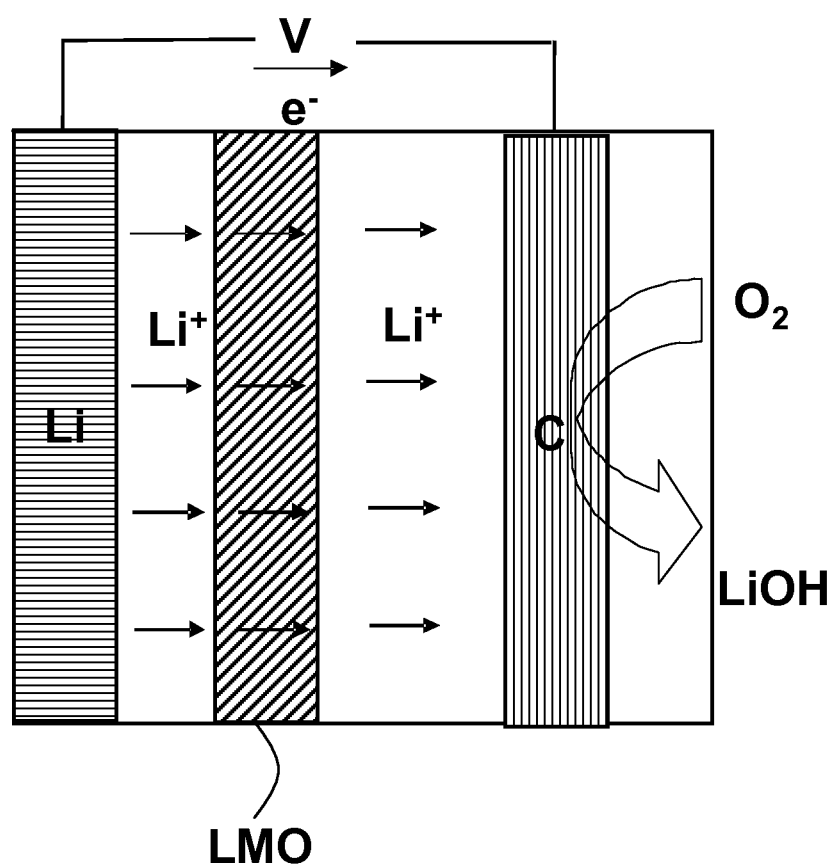
FIG. 3 depicts a lithium-air battery that includes an aqueous solution for oxygen reduction at the cathode, according to some embodiments.

FIG. 3 depicts an exemplary lithium-air battery structure with an aqueous solution for oxygen reduction. The lithium metal oxide layer allows water to be utilized as a solvent on the right-hand side, with reference to FIG. 3. Water is a preferred solvent in some embodiments because oxygen reduction in aqueous media is faster than in non-aqueous media. Additionally, water can dissolve $Li_2O$ to form LiOH. This conversion may prevent passivation of the cathode surface and increase battery power.

In one embodiment of a lithium-air battery structure, a porous carbon electrode is supported with platinum or nickel oxide catalyst. The aqueous solution is 1-5 M KOH. Oxygen reduction generates $OH^-$ anions. The net battery reaction is: $4\ Li+O_2+2\ H_2O=4\ LiOH$.

In some embodiments, a non-aqueous solution is employed for oxygen reduction on the cathode side. When reacting oxygen with lithiated metal oxide and in the absence of water, oxygen can form lithium peroxide, $Li_2O_2$, which may be reversibly charged. In these embodiments, the lithium metal oxide separator layer prevents water from reaching lithium.

The possible composition and methods of fabrication for non-porous layer of FIG. 3 are similar to those described above with reference to FIG. 1, except that the redox potential of lithium insertion into the non-porous layer should be close to the redox potential of oxygen reduction, which is between 2-3 V versus Li. Amorphous vanadium oxide is preferred, since its potential continuously varies with the insertion of lithium.

Figure 4:
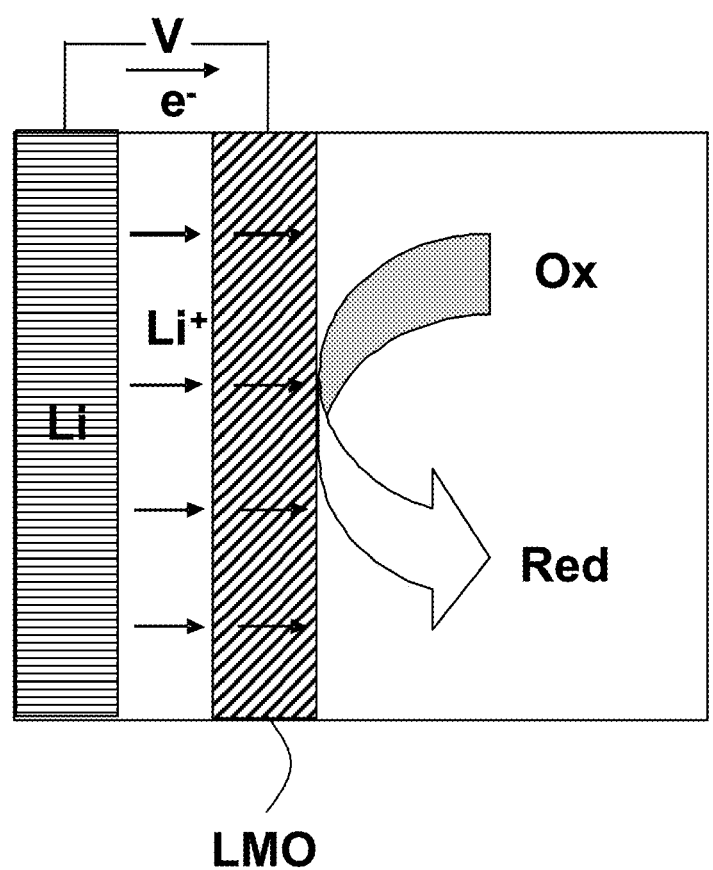
FIG. 4 illustrates a generalized scheme of various embodiments of the invention, wherein the battery reaction utilizes an oxidant capable of reacting with lithium metal oxide to form a reductant.

Other variations of the invention are premised on the realization that a non-porous lithium metal oxide layer may be used to assist the overall chemical reaction at the cathode side, as follows. The generalized scheme shown in FIG. 4 illustrates that any oxidant (Ox) capable of reacting with lithium metal oxide (LMO) may be used for the battery reaction to form the reductant (Red). The cathode may include any liquid or gas that is capable of reacting with lithium metal oxide in a certain voltage range.

As used herein, an "assisted cathode" is a combination of a lithium metal oxide layer and a cathode-side fluid. Any fluid (liquid or gas) that can react with lithium metal oxide may be used in the assisted cathode, since the LMO layer only allows the passage of lithium ions and electrons, but nothing else. Exemplary cathode fluids include, but are not limited to, $O_2$, $Br_2$, $SO_2$, $SOCl_2$, $SO_2Cl_2$, and $I_2$. Various inert diluents may be present, such as $N_2$.

Figure 5:
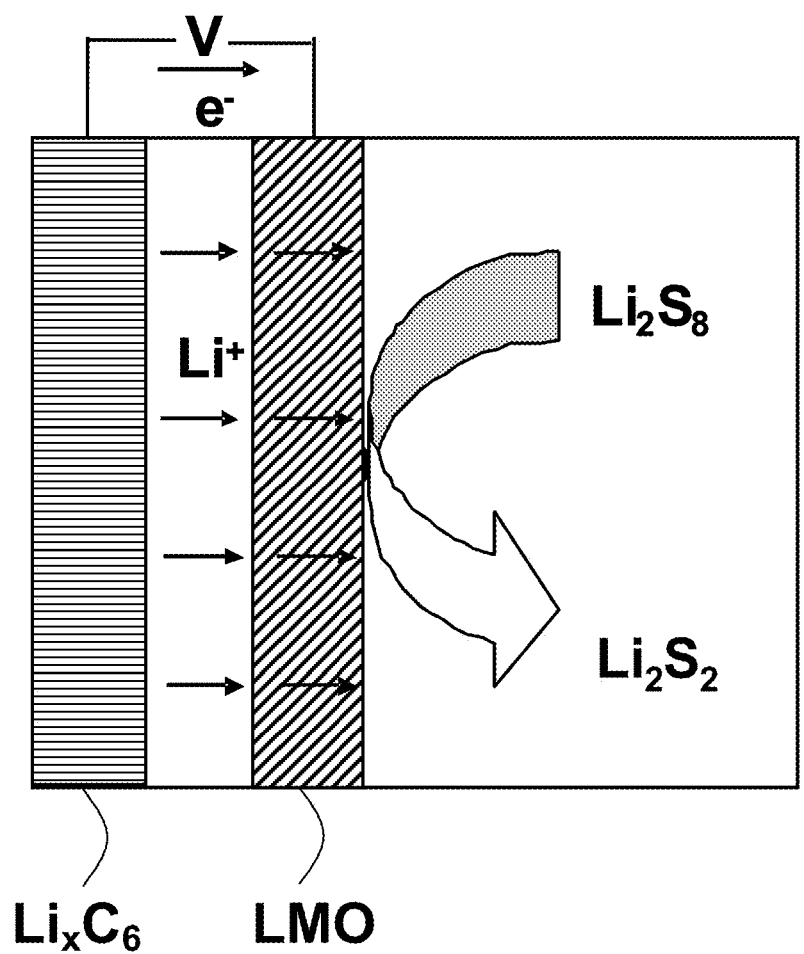
FIG. 5 depicts a lithium-ion battery with a non-porous lithium metal oxide layer on the cathode side, at which lithium polysulfide can react with lithium metal oxide to consume lithium and reduce polysulfide, according to some embodiments.

FIG. 5 depicts a lithium-ion battery that incorporates an assisted cathode. In this particular design, graphitic carbon and lithium metal oxide form a battery structure wherein the non-porous lithium metal oxide layer assists the overall chemical reaction at the cathode side. On the back side of the oxide electrode (not exposed to the electrolyte) is a solution of lithium polysulfide dissolved in sulfolane. Lithium polysulfide reacts with the lithium metal oxide to consume lithium.

During battery discharge, lithium is removed from the carbon anode and inserted into the oxide electrode, causing its potential to drop. $Li_2S_8$ will react with the oxide once its potential drops below its reduction potential. This process may continue until all $Li_2S_8$ is consumed. During battery charging, the reverse process takes place. The net battery reaction is the reduction of the polysulfide, which can be represented with the overall chemical reaction $Li_2S_8+6\ Li=4\ Li_2S_2$ where the Li is derived from the selected lithium metal oxide material. The metal oxide layer effectively serves as a reaction mediator. This battery structure prevents sulfur crossover and makes use of long-cycling lithiated carbon as the anode. If desired, Li metal may be used instead of $Li_xC_6$ as the anode.

The possible composition and methods of fabrication for this non-porous layer are similar to those described above with reference to FIG. 1, except that the redox potential of lithium insertion into the lithium oxide layer is preferably lower than that of lithium addition to $Li_2S_8$. The reason for this preference is so that during battery discharge, $Li_2S_8$ spontaneously reduces the lithium metal oxide by removing electrons and lithium ions. The potential difference, however, should be as small as possible to minimize energy loss to heat (due to exothermic enthalpy of reaction).

The battery voltage is determined by the potential difference between LMO and $Li_xC_6$, not between $Li_2S_8$ and $Li_xC_6$. Since the polysulfide reactions ($Li_2S_8 \rightarrow Li_2S_6 \rightarrow Li_2S_4 \rightarrow Li_2S_3 \rightarrow Li_2S_2$) take place at an average voltage of 2.0 V, it is preferred that the selected LMO can be reversibly discharged to this region. More preferably, a cathode material with no clear plateau is employed since the voltage continuously decreases until the reaction with polysulfide commences. Some preferred embodiments employ amorphous vanadium oxide, such as compositions according to $Li_xV_2O_y$ (wherein $0<x<5$, $4<y<5$).

In some embodiments, a plurality (two or more) of non-porous layers are used in an overall structure. For example, a first non-porous layer (such as lithium metal oxide, but not so limited) may be used within a composite separator layer, while a second non-porous layer is employed at the cathode side to assist the net cathode chemistry, i.e. serve as a reaction mediator. The composition, thickness, and other physical or chemical properties of the first and second non-porous layers, or more layers if desired, may be the same or different.

Battery structural features applicable to many variations of the invention will now be further described, again without limiting the invention's scope in any way.

The cathode material, or the non-porous layer material within an assisted cathode, preferably exhibits long cycle life and calendar life. The material may be, for example, a lithium metal oxide, phosphate, or silicate. Exemplary cathode or non-porous layer materials suitable for the present invention include, but are not limited to, $LiMO_2$ (M=Co, Ni, Mn, or combinations thereof); $LiM_2O_4$ (M=Mn, Ti, or combinations thereof); $LiMPO_4$ (M=Fe, Mn, Co, or combinations thereof); and $LiM_xM'_{2-x}O_4$ (M, M'=Mn or Ni).

The cathode, or the non-porous layer within an assisted cathode, may further comprise one or more conductive fillers to provide enhanced electronic conductivity. Examples of conductive fillers include, but are not limited to, conductive carbons, graphites, activated carbon fibers, non-activated carbon nanofibers, metal flakes, metal powders, metal fibers, carbon fabrics, metal mesh, and electrically conductive polymers. The cathode or non-porous layer may also further comprise other additives such as, for example, alumina, silica, and transition-metal chalcogenides.

The cathode, or the non-porous layer within an assisted cathode, may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, polytetrafluoroethylenes, polyvinylidene fluorides, ethylene-propylene-diene rubbers, polyethylene oxides, acrylates, methacrylates, divinyl ethers, and the like.

The anode material preferably exhibits long cycle life and calendar life. Exemplary anode materials suitable for the present invention include, but are not limited to, carbon materials such as graphite, coke, soft carbons, and hard carbons; and metals such as Si, Al, Sn, or alloys thereof. Other exemplary anode materials include titanium oxides, germanium, copper/tin, and lithium compounds containing metal oxides, such as oxides of W, Fe, and Co. Anodes can also include fillers, binders, and current collectors.

In some embodiments, the anode material consists essentially of graphitic carbon or another electron-conducting carbon. Some examples of electron-conducting carbon include natural graphites, such as flaky graphite, plate-like graphite, and other types of graphite; high-temperature sintered carbon products obtained, for example, from petroleum coke, coal coke, celluloses, saccharides, and mesophase pitch; artificial graphites, including pyrolytic graphite; carbon blacks, such as acetylene black, furnace black, Ketjen black, channel black, lamp black, and thermal black; asphalt pitch, coal tar, active carbon, mesophase pitch, and polyacetylenes.

Current collectors collect electrical current generated and provide an efficient surface for attachment of the electrical contacts leading to the external circuit. Current collectors may be made from any suitable materials, such as (but not limited to) Al, Cu, or Ni. The current collectors may also be fabricated from alloys, such as stainless steel.

Physically, the current collectors may be thin foils, such as foils with thicknesses in the 5-50 μm range. Other configurations that may be used for the current collectors include metal meshes, metal nets, perforated metal, metallized plastic films, metal grids, expanded metal grids, metal wools, woven carbon fabrics, woven carbon meshes, non-woven carbon meshes, and carbon felts.

Electrolytes generally include a solvent and a lithium salt (anion plus lithium cation). Examples of the solvent that can be used include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. Ethylene carbonate and propylene carbonate are preferable. As is known in the art, other minor components and impurities may be present in the electrolyte composition.

Lithium salts include, but are not limited to, $LiClO_4$, $LiBF_4$, $LiPF_6$, $LiCF_3SO_3$, $LiCF_3CO_2$, $LiAsF_6$, $LiSbF_6$, $LiAlCl_4$, LiCl, LiBr, and LiI, which may be used alone or as a mixture of two or more. $LiBF_4$ and $LiPF_6$ are preferable, in some embodiments. The concentration of the salt is not particularly limited, but preferably is about 0.1 to 5 mol/L of the electrolytic solution.

A battery can be packaged into either prismatic format cells or cylindrical cells, for example. In the prismatic format, the stacked structure is preferably sealed with a packaging material capable of preventing air and water contamination of the battery.

Lithium-ion, lithium-sulfur, or lithium-air batteries can be included in a battery pack, which includes a plurality of electrochemical cells that are electrically connected in series and/or in parallel. These battery packs come in many shapes, sizes, capacities, and power ratings, depending on the intended use of the battery pack. Battery packs will typically include a thermal-management system.

Lithium-based batteries according to this invention are suitable for operating across a variety of temperature ranges. Exemplary operation temperatures may be from −50° C. to 80° C., such as for military applications. For computers and related devices, as well as for electric-vehicle applications, temperatures from −30° C. to 60° C. are possible.

Practical applications for this invention include, but are not limited to, aircraft, satellites, launch vehicles, electric cars, electric bikes, laptop computers, mobile phones, cameras, medical devices, and power tools. As will be appreciated by a person of skill in this art, the present invention has significant commercial relevance. Battery life is often a critical factor in the marketplace, especially for commercial, military, and aerospace applications (e.g., satellites). The current invention provides long-term benefits in battery safety, cost, and performance.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan. This invention also incorporates routine experimentation and optimization of the structures, systems, and methods described herein.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A battery structure comprising:
    (a) an anode for extracting selected metal ions;
    (b) a cathode for inserting said metal ions;
    (c) a liquid electrolyte for transporting said metal ions between said anode and said cathode; and
    (d) a separator comprising a non-porous layer that is electronically conductive and permeable to said metal ions but not appreciably permeable to any other chemical species,
    wherein said non-porous layer is laminated with electronically resistive porous layers,
    and wherein the electronic conductivity of electrons in said non-porous layer is selected from about $10^{-2}$ to $10^{2}$ S/cm as measured within a temperature range from $-50°$ C. to $80°$ C.

2. The battery structure of claim 1, wherein the ionic conductivity of said metal ions in said non-porous layer is selected from about $10^{-5}$ to $10^{-2}$ S/cm.

3. The battery structure of claim 2, wherein said ionic conductivity of said metal ions is selected from about $10^{-3}$ to $10^{-2}$ S/cm.

4. The battery structure of claim 1, wherein said electronic conductivity is selected from about $10^{-1}$ to 1 S/cm as measured within a temperature range from $-50°$ C. to $80°$ C.

5. The battery structure of claim 1, wherein said non-porous layer comprises lithium metal oxide, lithium metal phosphate, or lithium metal sulfide.

6. The battery structure of claim 1, wherein said non-porous layer has a composition that is different than the composition of either of said anode or said cathode.

7. The battery structure of claim 1, wherein said non-porous layer has a thickness selected from about 2 μm to 200 μm.

8. The battery structure of claim 1, wherein said non-porous layer is a free-standing layer without structural support by either of said anode or said cathode.

\* \* \* \* \*